United States Patent
Yi (10) Patent No.: US 9,491,694 B2
(45) Date of Patent: Nov. 8, 2016

(54) OPERATION METHOD OF USER EQUIPMENT IN MULTI-CARRIER SYSTEM

(71) Applicant: SK TELECOM CO., LTD., Seoul (KR)

(72) Inventor: Sang Mi Yi, Seoul (KR)

(73) Assignee: SK TELECOM CO., LTD., Seoul (KR)

( * ) Notice: Subject to any disclaimer, the term of this patent is extended or adjusted under 35 U.S.C. 154(b) by 0 days.

(21) Appl. No.: 14/858,665

(22) Filed: Sep. 18, 2015

(65) Prior Publication Data

US 2016/0014681 A1  Jan. 14, 2016

Related U.S. Application Data

(63) Continuation of application No. PCT/KR2014/002222, filed on Mar. 17, 2014.

(30) Foreign Application Priority Data

Mar. 18, 2013  (KR) .................. 10-2013-0028786
Apr. 8, 2013   (KR) .................. 10-2013-0038243

(51) Int. Cl.
    *H04W 48/16*  (2009.01)
    *H04W 48/18*  (2009.01)

(52) U.S. Cl.
    CPC ............. *H04W 48/16* (2013.01); *H04W 48/18* (2013.01)

(58) Field of Classification Search
    CPC ............................ H04W 48/16; H04W 48/18
    USPC ................... 455/422.1, 434–445; 370/331
    See application file for complete search history.

(56) References Cited

U.S. PATENT DOCUMENTS

| 8,774,131 | B1* | 7/2014 | Singh | ............... | H04W 48/18 |
| | | | | | 370/236 |
| 2007/0191010 | A1* | 8/2007 | Kim | ............... | H04W 76/027 |
| | | | | | 455/436 |
| 2009/0036098 | A1* | 2/2009 | Lee | ............... | H04W 48/20 |
| | | | | | 455/411 |
| 2012/0094707 | A1* | 4/2012 | Chen | ............... | H04W 76/027 |
| | | | | | 455/517 |

(Continued)

FOREIGN PATENT DOCUMENTS

KR  1020120055691 A  5/2012
WO  2012064094 A2  5/2012

(Continued)

OTHER PUBLICATIONS

International Search Report for PCT/KR2014/002222 mailed on Jun. 25, 2014.

*Primary Examiner* — Michael Mapa
(74) *Attorney, Agent, or Firm* — Hauptman Ham, LLP (57) ABSTRACT

Disclosed is a User Equipment (UE) accessing a Long Term Evolution (LTE) wireless communication system operating a Multi-Carrier (MC). The UE includes: an access history identification unit, when the UE accesses the LTE wireless communication system in a first frequency band on which the UE is camped, identifies whether the UE stores an access fail history of the first frequency band; a search unit, when the UE stores the access fail history of the first frequency band, receives a parameter indicating an accessibility to the LTE wireless communication system in a second frequency band, and searches for the second frequency band based on the received parameter; and an access control unit, when the LTE wireless communication system is found in the second frequency band based on a result of the search, accesses the LTE wireless communication system through the second frequency band.

15 Claims, 6 Drawing Sheets

(56) References Cited

U.S. PATENT DOCUMENTS

| | | | |
|---|---|---|---|
| 2013/0023265 A1* | 1/2013 | Swaminathan | H04W 76/027 455/423 |
| 2013/0058244 A1 | 3/2013 | Huang | |
| 2013/0273916 A1* | 10/2013 | Gupta | H04W 36/34 455/436 |
| 2014/0269275 A1* | 9/2014 | Jun | H04W 36/22 370/230 |

FOREIGN PATENT DOCUMENTS

| | | |
|---|---|---|
| WO | 2012135326 A2 | 10/2012 |
| WO | 2013019501 A1 | 2/2013 |

* cited by examiner

OPERATION METHOD OF USER EQUIPMENT IN MULTI-CARRIER SYSTEM

CROSS-REFERENCE TO RELATED APPLICATIONS

The present application is a continuation of International Patent Application No. PCT/KR2014/002222, filed Mar. 17, 2014, which is based upon and claims the benefit of priority to Korean Patent Application Nos. 10-2013-0028786, filed on Mar. 18, 2013, and 10-2013-0038243, filed on Apr. 8, 2013. The disclosures of the above-listed applications are hereby incorporated by reference herein in their entirety.

TECHNICAL FIELD

The present disclosure relates to a User Equipment (UE) apparatus and, more particularly, to a UE apparatus operating in a wireless communication system managing a plurality of frequency bands and a method of accessing a wireless communication system by a UE apparatus.

BACKGROUND ART

The statements in this section merely provide background information related to the present disclosure and do not necessarily constitute prior art.

Recently, a mobile communication system providing a communication service through a plurality of frequency bands is operated. For example, an LTE system may also manage two or more frequency bands, and use a method of distributing loads according to the number of users to which one BS can provide services. In this case, a cell reselection or redirection function in which the UE naturally moves between frequency bands through a parameter configuration according to a priority of the UE may be used.

However, the inventor(s) has noted that, an operation in which, when an access attempt by the UE fails due to the occurrence of temporary overloads or errors in a cell of a particular LTE frequency band, the UE performs the access attempt in another frequency band, is not defined. For example, with respect to a UE operation when there is no response to Random Access Channel (RACH) preamble, the 3GPP TS36.321 standard discloses only a re-access attempt in one cell without consideration of another LTE frequency band.

Accordingly, the inventor(s) has noted that, in order to efficiently operate a mobile communication system using a plurality of frequency bands, a method of intelligent access of the UE in various frequency bands is required.

SUMMARY

An aspect of the present disclosure is to provide a User Equipment (UE) apparatus operating in a wireless communication system, which manages a plurality of frequency bands. Another aspect of the present disclosure is to provide a method of controlling access by a UE apparatus operating a wireless communication system, which manages a plurality of frequency bands.

In accordance with an aspect of the present disclosure, a User Equipment (UE) accessing a Long Term Evolution (LTE) wireless communication system operating a Multi-Carrier (MC) is provided. The UE includes: an access history identification unit configured to, when the UE accesses the LTE wireless communication system in a first frequency band on which the UE is camped, identify whether the UE stores an access fail history of the first frequency band by referring to an access fail counter for the first frequency band; a search unit configured to, when the UE stores the access fail history of the first frequency band, receive a parameter indicating an accessibility to the LTE wireless communication system in a second frequency band, which is different from the first frequency band, and search for the second frequency band based on the received parameter; and an access control unit configured to, when the LTE wireless communication system is found in the second frequency band based on a result of the search, access the LTE wireless communication system through the second frequency band.

In accordance with another aspect of the present disclosure, a method of accessing a Long Term Evolution (LTE) wireless communication system operating a Multi-Carrier (MC) by a User Equipment (UE) apparatus is provided. The method includes: when the UE accesses the LTE wireless communication system in a first frequency band on which the UE apparatus is camped, identifying whether the UE stores an access fail history of the first frequency band by referring to an access fail counter for the first frequency band; when the UE stores the access fail history of the first frequency band, receiving a parameter indicating an accessibility to the LTE wireless communication system in a second frequency band, which is different from the first frequency band; searching for the second frequency band based on the received parameter; and when the LTE wireless communication system is found in the second frequency band based on a result of said searching, accessing the LTE wireless communication system through the second frequency band.

In accordance with another aspect of the present disclosure, a non-transitory computer-readable storage medium storing a program for causing a processor to execute operations is provided. The operations include: when the UE accesses the LTE wireless communication system in a first frequency band on which the UE apparatus is camped, identifying whether the UE stores an access fail history of the first frequency band by referring to an access fail counter for the first frequency band; when the UE stores the access fail history of the first frequency band, receiving a parameter indicating an accessibility to the LTE wireless communication system in a second frequency band, which is different from the first frequency band; searching for the second frequency band based on the received parameter; and when the LTE wireless communication system is found in the second frequency band based on a result of said searching, accessing the LTE wireless communication system through the second frequency band.

DESCRIPTION OF THE DRAWINGS

The above and other objects, features and advantages of the present disclosure will be more apparent from the following detailed description taken in conjunction with the accompanying drawings, in which.

DETAILED DESCRIPTION

Hereinafter, embodiments of the present disclosure will be described in more detail with reference to the accompanying drawings. In the following description, it should be noted that the same elements are designated by the same reference numerals if possible although they are shown in different drawings. Further, a detailed description of known functions and configurations incorporated herein will be omitted when it may make the subject matter of embodiments according to the present disclosure rather unclear.

Figure 1:
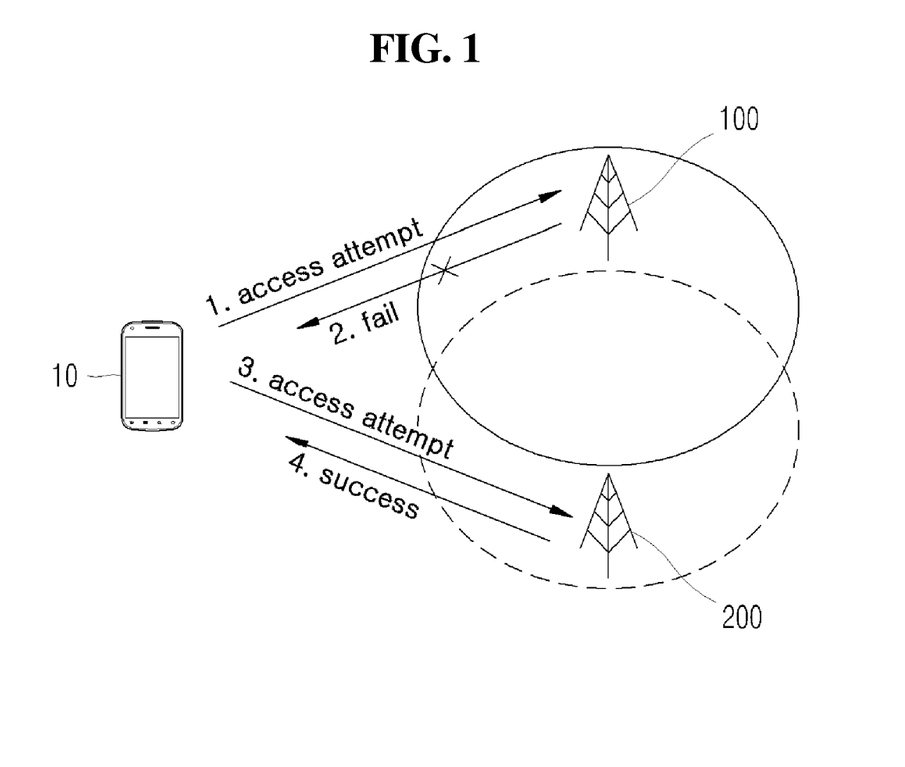
FIG. 1 illustrates a conceptual diagram of a mobile communication system according to some embodiments of the present disclosure.

The present disclosure relates to a method and an apparatus for performing a Radio Resource Control (RRC) connection establishment and configuring a control channel by a UE apparatus in an environment where there are cells operating different frequency bands within the same area. FIG. 1 illustrates a conceptual diagram of a mobile communication system according to some embodiments of the present disclosure.

The mobile communication system includes Base Stations (BSs) 100 and 200 and a User Equipment (UE) 10. Hereinafter, it is assumed that the mobile communication system is a Long Term Evolution (LTE) or Evolved Packet Core (EPC) wireless communication system to which a multi-carrier is applied and the BSs 100 and 200 operate in different frequency bands (for example, the BS 100 operates in an LTE band 5 and the BS 200 operates in an LTE band 3). In some embodiments, the BSs are charged with the same area and/or different areas and provide a communication service. Further, in some embodiment, the UE 10 is a UE, which can access the BSs 100 and 200 through corresponding frequency bands, that is, the UE supports a multi-band or multi-carrier. In addition, in some embodiments, the UE 10 is a multi-mode UE, which accesses a heterogeneous network.

When the UE is not able to access the BS due to some problems between the BS and the UE (for example, Random Access Channel (RACH) fail, Radio Resource Control (RRC) connection reject, and the like), the UE performs an operation for continuously attempting the access to the same BS (or cell). For example, when a position of the UE is registered in a particular LTE frequency band (for example, LTE band 5) (in an attach state) and a user desires to receive a data service in an RRC_Idle state, the UE attempts to establish a RRC connection (radio link connection) by a Non-access stratum (NAS) service request trigger. When the UE fails to establish the RRC connection, the UE waits for the NAS service request trigger to attempt to establish the RRC connection in the same cell.

At this time, when the corresponding cell or frequency band is in a busy state or an uplink condition is not good and thus a RACH failure occurs, the user is not able to use the data service for a long time. When even the UE supporting the multi-band fails the NAS service request due to the RACH failure, the UE is not able to change the frequency band by itself with attempting re-access, so that the service is continuously impossible.

In such a case, since the BS is not able to move (redirect) the UE to another frequency band (for example, LTE band 3), the UE is required to find another frequency band by itself and attempt the access.

In order to solve the above problem, when the UE according to the present disclosure fails the access to the BS 100 (for example, a RACH failure or RRC connection reject) as illustrated in FIG. 1, the UE attempts the access (for example, a RRC connection establishment) to the BS 200 of a different frequency band by itself with reference to a record of the access failure. To this end, the UE efficiently uses the wireless communication system operating the multi-carrier, thereby increasing an LTE service access rate. Meanwhile, the UE determines whether the UE is able to access the same type or a different type of the wireless communication system through a different frequency band in a corresponding area by receiving a predetermined parameter (for example, information on System Information Block type 5 (SIB5)).

Figure 2:
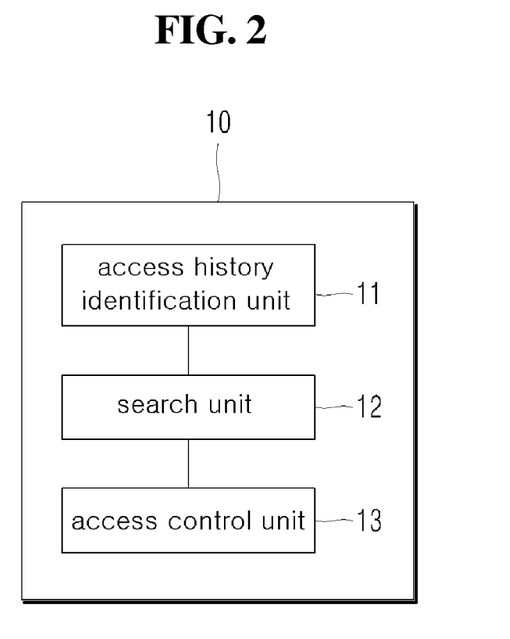
FIG. 2 is a schematic block diagram of a User Equipment (UE) according to some embodiments of the present disclosure.

FIG. 2 is a schematic block diagram of the UE according to some embodiments of the present disclosure.

As illustrated in FIG. 2, in some embodiments, the UE 10 according to some embodiments of the present disclosure includes an access history identification unit 11, a search unit 12, and an access control unit 13.

Herein, examples of the UE 10 include, but be not limited to, any mobile communication terminals operating based on communication protocols corresponding to various communication systems, and any information communication devices and their application devices, such as Portable Multimedia Players (PMPs), MP3 players, navigation systems, game consoles, laptop computers, netbooks, advertisement boards, Televisions (TVs), digital broadcasting players, Personal Digital Assistants (PDAs), and smart phones.

The UE 10 manages an access fail counter (for example, RACH fail counter, RRC reject counter, or the like) and determines whether to perform an access operation (for example, RACH procedure or RRC connection establishment) in a different frequency band by using the access fail counter. For example, when the UE 10 is an LTE UE, the UE 10 transmits an RRC connection request by a NAS service request. At this time, when the RACH failure history is generated, the UE 10 counts the number of RACH failures according to each LTE band and change the LTE band, so as to re-attempt the NAS procedure.

The access history identification unit 11 identifies whether there is an access fail history of a first frequency band (for example, a frequency band in which the UE is currently camped on) by referring to the access fail counter. In some embodiments, the UE stores data regarding the access fail counter. The access fail counter (for example, RACH fail counter SR) is managed according to each frequency band by the access history identification unit 11, and a value of the access fail counter is increased whenever the access attempt in each frequency band fails (for example, a RACH failure, RRC connection reject, or the like). At this time, a condition for increasing the value of the access fail counter is additionally configured. For example, in some embodiments, the value of the access fail counter (for example, RACH_Fail_counter_SR) is increased only when the RACH procedure is not successful until a particular timer (for example, T300) expires rather than whenever there is no response to an RACH preamble. Alternatively, in some embodiments, the value of the access fail counter is increased only when standby time information is included in an RRC connection reject message.

The value of the access fail counter is initialized as (e.g., reset to) "0" when the access attempt is successful. That is, after the access attempt is successful at a particular time point, RACH_Fail_counter_SR would be "0" at a time point when the NAS service request due to user data or background data (synchronization data of a particular application or the like) is generated and the RACH procedure for the RRC connection establishment starts.

When the access history identification unit 11 identifies that there is the access fail history of the first frequency band, the search unit 12 searches for a second frequency band which is different from the first frequency band. That is, when the value of the access fail counter for the frequency band (first frequency band) where the current UE stays (is camped on) corresponds to a value, which is not 0, the search unit 12 identifies whether another frequency band exists in order to access the wireless communication system through the other frequency band (second frequency band). For example, when the value of the access fail counter (for example, RACH_Fail_counter_SR) of the LTE frequency band (for example, band 5) where the current UE is camped on is "1", it is noted that there is the access fail in the corresponding frequency band, so that the search unit 12 re-attempts the NAS service request in another LTE frequency band (for example, band 3).

At this time, before searching for the second frequency band, the search unit 12 receives a parameter (neighbor cell information) indicating that the accessibility to the LTE wireless communication system in the second frequency band which is different from the first frequency band and determines whether to search for the second frequency based on the received parameter. That is, the search unit 12 starts a system search after identifying whether there is a wireless communication system accessible in another frequency band. In some embodiments, the parameter is transmitted from a wireless communication system to the UE, through various overhead messages in the first frequency band, and is inserted into a SystemInformationBlockType5 (SIB5) Information Element (IE) and then transmitted in the LTE system. The SIB5 IE refers to 3GPP TS 36.331.

TABLE 1

| SystemInformationBlockType5 field descriptions |
|---|
| interFreqBlackCellList |
| List of blacklisted inter-frequency neighbouring cells. |
| interFreqNeighCellList |
| List of inter-frequency neighbouring cells with specific cell re-selection parameters. |
| p-Max |
| Value applicable for the neighbouring E-UTRA cells on this carrier frequency. If absent the UE applies the maximum power according to the UE capability. |
| q-OffsetCell |
| Parameter "$Qoffset_{s,n}$" in TS 36.304 [4]. |
| q-OffsetFreq |
| Parameter "$Qoffset_{frequency}$" in TS 36.304 [4]. |
| q-QualMin |
| Parameter "$Q_{qualmin}$" in TS 36.304 [4]. If the field is not present, the UE applies the (default) value of negative infinity for $Q_{qualmin}$. |
| threshX-High |
| Parameter "$Thresh_{X, HighP}$" in TS 36.304 [4]. |
| threshX-HighQ |
| Parameter "$Thresh_{X, HighQ}$" in TS 36.304 [4]. |
| threshX-Low |
| Parameter "$Thresh_{X, LowP}$" in TS 36.304 [4]. |
| threshX-LowQ |
| Parameter "$Thresh_{X, LowQ}$" in TS 36.304 [4]. |
| t-ReselectionEUTRA |
| Parameter "$Treselection_{EUTRA}$" in TS 36.304 [4]. |
| t-ReselectionEUTRA-SF |

TABLE 1-continued

| SystemInformationBlockType5 field descriptions |
|---|
| Parameter "Speed dependent ScalingFactor for $Treselection_{EUTRA}$" in TS 36.304 [4]. If the field is not present, the UE behaviour is specified in TS 36.304 [4]. |

TABLE 2

| Conditional presence | Explanation |
|---|---|
| RSRQ | The field is mandatory present if threshServingLowQ is present in systemInformationBlockType3; otherwise it is not present. |

Tables 1 and 2 describe the SIB5 IE. A parameter indicating the accessibility to the LTE wireless communication system in the second frequency band is further added to Table 1 in some embodiments.

When the wireless communication system accessible in the second frequency band is found based on a result of the search, the access control unit 13 accesses the wireless communication system through the second frequency band. For example, after identifying the SIB5 information received from the currently camped on cell, the access control unit 13 searches for a cell in another frequency band, be camped on the found cell, and attempt the RACH procedure.

At this time, when there is no other frequency band to which the access control unit 13 can move, when the access through the second frequency band fails, or when the second frequency band is not found, the access control unit 13 moves to another wireless communication system (for example, a Wideband Code Division Multiple Access (WCDMA)) and access the wireless communication system. For example, when the value of the access fail counter (for example, RACH_Fail _counter_SR) counted in all frequency bands is greater than the number of all accessible LTE frequency bands, it means that the RRC connection establishment fails in all the frequency bands fails. Accordingly, at this time, the access control unit 13 moves to another wireless communication system and attempts to access to the corresponding system.

Meanwhile, in some embodiments, the UE further includes a notification unit for notifying the user of the UE that the access in the second frequency band is performed. In some embodiments, the notification unit displays an indicator identifying and indicating a frequency band, which the UE accesses, on a screen of the UE, and the indicator is visualized and displayed in a predetermined position of the screen of the UE in various forms. For example, the indicator is differently displayed based on different colors of an antenna bar, different icons, a character/symbol, or the like.

Figure 3:
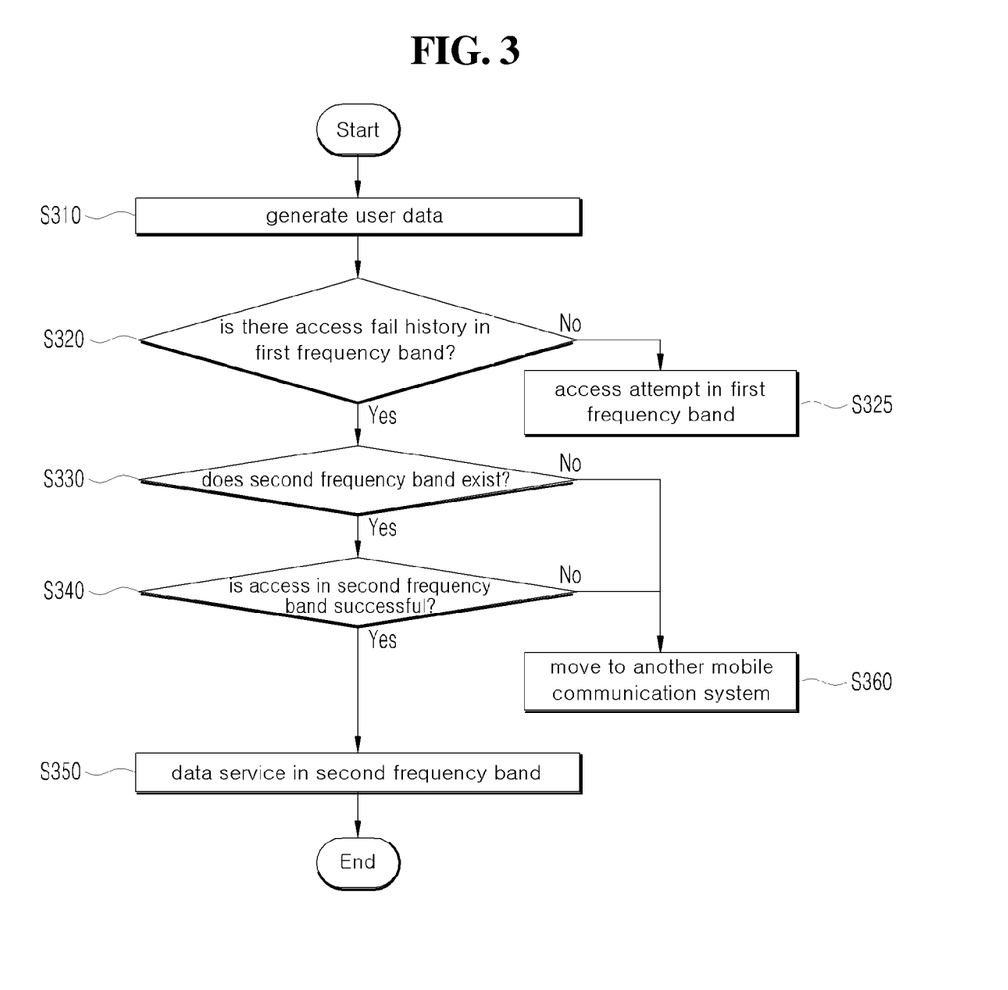
FIG. 3 is a flowchart of a method for accessing a wireless communication system operating a plurality of frequency bands by a UE apparatus according to some embodiments of the present disclosure.

FIG. 3 is a flowchart of a method for accessing a wireless communication system operating a plurality of frequency bands by a UE apparatus according to some embodiments of the present disclosure.

The method is performed by the UE apparatus described in FIGS. 1 and 2. In some embodiments, data such as access fail history and procedures of the method of accessing the wireless communication system operating the plurality of frequency bands according to this disclosure are implemented and stored in a computer-executable recording medium which is executed or accessed by a processor and/or an application-specific integrated circuit (ASIC) of the UE apparatus. The UE apparatus manges an access fail counter (for example, RACH fail counter) and determine whether to perform an access operation (for example, RACH procedure) in a different frequency band by using the access fail counter. For example, when the UE apparatus is an LTE UE, the UE apparatus transmits an RRC connection request by a NAS service request. At this time, when the RACH failure history is generated, the UE apparatus counts the number of RACH failures according to each LTE band and change the LTE band, so as to re-attempt the NAS procedure.

When user data is generated in step S310, the UE apparatus identifies whether there is an access fail history of a first frequency band (for example, a frequency band in which the UE is currently camped on) with reference to the access fail counter in step S320. The access fail counter (for example, RACH_Fail_counter_SR) is managed according to each frequency band by the UE apparatus, and a value of an access fail counter is increased whenever the access attempt in each frequency band fails. At this time, a specific condition for increasing the value of the access fail counter is additionally configured. For example, the value of the access fail counter (for example, RACH_Fail_counter_SR) is increased only when the RACH procedure is not successful until a particular timer (for example, T300) expires rather than whenever there is no response to an RACH preamble. Alternatively, the value of the access fail counter is increased only when standby time information is included in an RRC connection reject message.

The access fail counter is initialized as "0" when the access attempt is successful. That is, after the access attempt is successful at a particular time point, RACH_Fail_counter_SR is "0" at a time point when the NAS service request due to user data or background data (synchronization data of a particular application or the like) is generated and the RACH procedure for the RRC connection establishment starts.

When the UE apparatus identifies that there is no access fail history of the first frequency band, the UE apparatus performs an access process in the corresponding frequency band in step S325.

When the UE apparatus identifies that there is the access fail history of the first frequency band, the UE apparatus searches for a second frequency band different from the first frequency band in step S330. That is, when the value of the access fail counter for the frequency band (first frequency band) where the current UE stays (is camped on) corresponds to a value, which is not 0, the search unit 12 identifies whether another frequency band exists in order to access the wireless communication system through the other frequency band (second frequency band). For example, when the value of the access fail counter (for example, RACH_Fail_counter_SR) of the LTE frequency band (for example, band 5) where the current UE is camped on is "1", it is noted that there is the access fail in the corresponding frequency band. Accordingly, if the UE apparatus re-attempts the NAS service request in the same frequency band, the UE apparatus searches for another LTE band (for example, band 3). In some embodiments, the searches are conducted to identify whether there is a wireless communication system accessible in another frequency band.

At this time, before searching for the second frequency band, the UE apparatus receives a parameter indicating that the access to the wireless communication system in the second frequency band different from the first frequency band is possible and determine whether to search for the second frequency based on the received parameter. That is, the UE apparatus starts a system search after identifying whether there is a wireless communication system, which can access another frequency band. The parameter is transmitted through various overhead messages in the first frequency band, and is inserted into a SystemInformationBlockType5 (SIB5) Information Element (IE) and then transmitted in the LTE system. The SIB5 IE refers to 3GPP TS 36.331.

When the wireless communication system accessible in the second frequency band is found based on a result of the search, the UE apparatus accesses the wireless communication system through the second frequency band in step S340. For example, after identifying the SIB5 information received from the currently camped on cell, the UE apparatus searches for a cell in another frequency band, is camped on the found cell, and attempts the RACH procedure. When the access in the second frequency band is successful, the UE apparatus receives a data service in the corresponding frequency band in step S350.

At this time, when there is no other frequency band to which the UE apparatus can move, when the access through the second frequency band fails, or when the second frequency band is not found, the UE apparatus moves to another wireless communication system (for example, WCDMA) and access the wireless communication system in step S360. For example, when the value of the access fail counter (for example, RACH_Fail_counter_SR) counted in all frequency bands is larger than the number of all accessible LTE frequency bands, it means that the RRC connection establishment fails in all the frequency bands. In some embodiments, there are many counter values for one frequency (ex. 0, 1, 2, 3, 4). However, in some other embodiments which are the cases of another frequency band being searched when an access fail counter is 1, then an access fail counter is 0 or 1.

Accordingly, at this time, the access control unit 13 moves to another wireless communication system and attempts the access to the corresponding system.

Meanwhile, in some embodiments, the UE apparatus informs the user of the UE that the access in the second frequency band is performed. The UE apparatus displays an indicator identifying and indicating a frequency band, which the UE apparatus accesses, on a screen, and the indicator is visualized and displayed in an upper end of the screen of the UE in various forms.

Hereinafter, some embodiments in which, when an RRC connection is rejected while an RRC connection establishment is performed in an environment where there are cells operating different frequency bands in the same area, the UE apparatus performs the RRC connection establishment with a cell of another frequency band by itself.

The 3rd generation mobile communication service is classified into a non-synchronous type Wideband Code Division Multiple Access (WCDMA) system proposed mainly by the 3rd Generation Partnership Project (3GPP) and a synchronous type CDMA-2000 proposed mainly by the 3GPP2. Particularly, the WCDMA system is a wireless protocol recommended by IMT-2000, and services thereof are provided by many communication service operators all around the world.

The 3GPP Release 8 discloses network architecture called Evolved Packet Core (EPC). The EPC supports Evolved-UMTS Terrestrial Radio Access Network (E-UTRAN) which is an evolved RAN evolved from a core network of the 3GPP system architecture and has an efficient network structure having a simplified network node to increase efficiency of a packet network. A wireless communication system including the EPC and the E-UTRAN is called an Evolved Packet System (EPS).

An EPC network has been introduced in a state where a WCDMA mobile communication system has been already is widely distributed all around the world. In an initial introduction step of the EPC network, there exists an environment where WDCMA networks and EPC networks coexist before all the WCDMA networks are replaced with the EPC networks. Accordingly, in the environment where heterogeneous networks coexist, a multi-mode UE apparatus, which can execute both a mode for accessing the WCDMA network and a mode for accessing the EPC network, is used. Further, in an environment where the WCDMA network, the EPC network, and a CDMA network coexist, a multi-mode UE apparatus, which can also execute a mode for accessing the CDMA network, is used. When the EPC network supports a multi-carrier operating a plurality of E-UTRA frequency bands, a multi-band UE apparatus, which can access all cells of different frequency bands, is used. A UE apparatus having both a multi-mode function and a multi-band function is called a multi-mode multi-band UE apparatus.

Meanwhile, the UE apparatus first performs a RRC connection establishment for configuring an RRC connection to start a Circuit Service (CS) call or a Packet Service (PS) call in an idle state. Here, in some embodiments, the idle state refers to a mode in which there is no control channel between the UE apparatus and the BS. When the control channel is configured between the UE apparatus and the BS through the RRC connection establishment, control information for call configuration between the UE apparatus and the BS is transmitted/received through the control channel, a radio bearer for data transmission is configured, and data is transmitted/received through the radio bearer.

As described above, in order to configure the RRC connection, the UE apparatus transmits an RRC connection request message in a state where a position of the UE apparatus is registered in a proper cell. When the UE apparatus receives an RRC connection configuration message as a response message, the UE apparatus transmits an RRC connection configuration completion message to inform of the end of the RRC connection establishment.

However, in some embodiments, the UE apparatus transmits an RRC connection reject message indicating rejection of the RRC connection configuration as a response message of the RRC connection request message in the cell in which the position thereof has been registered.

When the RRC connection reject message includes wait time information, the UE apparatus transmit the RRC connection request message again after waiting for the corresponding wait time.

According to the prior approach, in such a situation, the UE apparatus attempts the RRC connection configuration by continuously transmitting the RRC connection request message to the same cell although a busy state of overload of the cell in which the current position of the UE apparatus is registered is maintained after the UE apparatus unconditionally waits for the corresponding wait time.

Accordingly, the user of the UE apparatus cannot use the data service while the RRC connection configuration is rejected. In general, the wait time information included in the RRC connection reject message uses several seconds, so that the user of the UE apparatus feels inconvenience for a long time even though the RRC connection is rejected only once.

Figure 4:
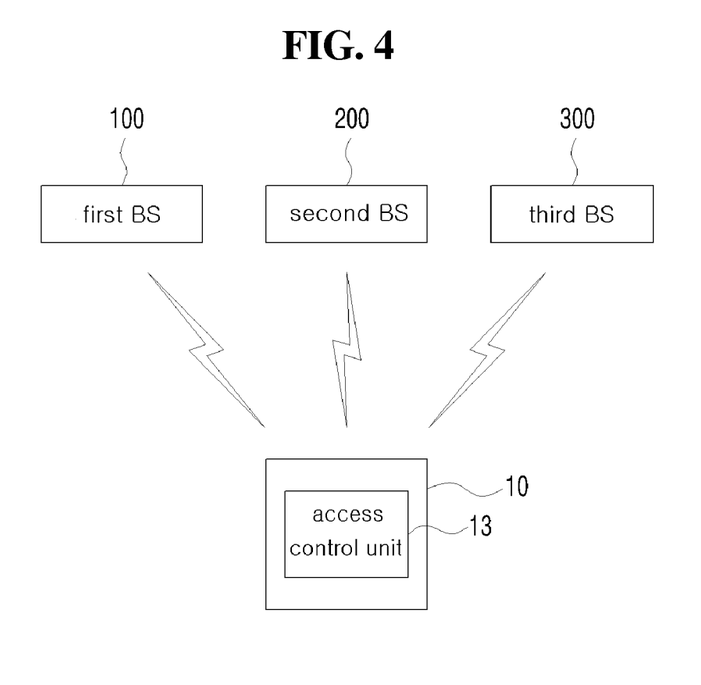
FIG. 4 is a schematic block diagram of a wireless communication system to which an access control unit is applied according to some embodiments of the present disclosure.

FIG. 4 is a schematic block diagram of a wireless communication system to which the access control unit 13 is applied according to some embodiments of the present disclosure.

In some embodiments, the access control unit 13 is included in the UE apparatus 10, and the UE apparatus 10 receives a wireless communication service including a data communication service from a plurality of BSs including a first BS 100 to a third BS 300. For example, the UE apparatus 10 is a multi-band UE apparatus, which can receive a wireless communication service through a wireless communication system operating a plurality of frequency bands, or a multi-mode multi-band UE apparatus, which can receive a communication service through a legacy wireless communication system such as WCDMA (or CDMA) together with an LTE wireless communication system.

Here, it is assumed that the first BS 100 is a BS operating a first frequency band in a cell of a first wireless communication system, the second BS 200 is a BS operating a second frequency band in a cell of the first wireless communication system, and the third BS 300 is a BS operating a particular frequency band in a cell of a second wireless communication system. For example, the first BS 100 uses band 5 (850 MHz band) among E-UTRA frequency bands in the LTE system, the second BS 200 uses band 3 (1800 MHz band) among the E-UTRA frequency band in the LTE system, and the third BS 300 uses band 1 (2.1 GHz band) among the E-UTRA frequency band in the WCDMA system.

Figure 5:
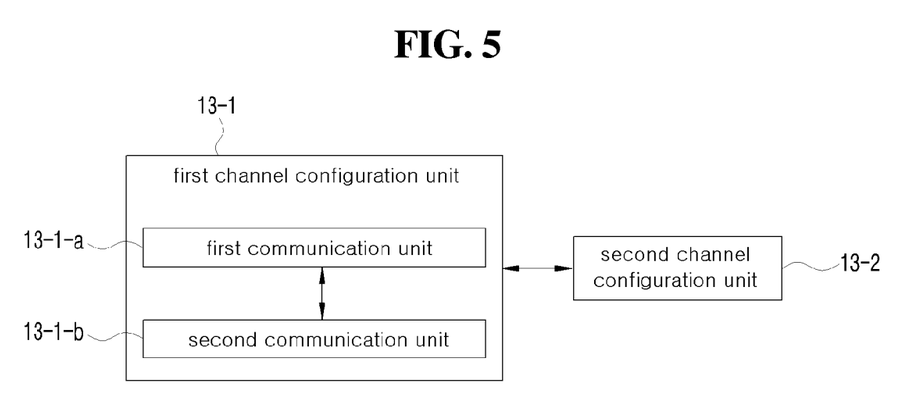
FIG. 5 is a schematic block diagram of an access control unit according to some embodiments of the present disclosure.

FIG. 5 is a schematic block diagram of the access control unit according to some embodiments of the present disclosure.

As illustrated in FIG. 5, the access control unit 13 according to some embodiments of the present disclosure includes a first channel configuration unit 13-13-1 and a second configuration unit 13-13-2, and the first channel configuration unit 13-13-1 includes a first communication unit 13-13-1-*a* and a second communication unit 13-13-1-*b*. In some embodiments, each of the first and second communication unit is a processor/AISC or an TX/RX modules with antenna.

The first channel configuration unit 13-13-1 performs a channel configuration such as the RRC connection establishment by accessing the first wireless communication system through the first communication unit 13-13-1-*a* and the second communication unit 13-13-1-*b*.

In an RRC idle state, the first communication unit 13-13-1-*a* transmits RRC connection request message 1 to the first BS 100 and receives response message 1 of RRC connection request message 1 from the first BS 100. When response message 1 corresponds to an RRC connection configuration message, the first communication unit 13-13-1-*a* transmit an RRC connection configuration completion message to the first BS 100. When response message 1 corresponds to an RRC connection reject message, the first communication unit 13-13-1-*a* selectively performs the next procedure according to wait time information or redirection information included in the corresponding RRC connection reject message.

Here, when wait time information is included in the RRC connection reject message, the access history identification unit increases a value of an access fail counter, and the first communication unit 13-13-1-*a* transmits RRC connection request message 1 again or makes a request for a channel configuration such as the RRC connection establishment to the second communication unit 13-13-1-*b* according to a band change condition such as a case where the value of the access fail counter is greater than or equal to a preset value.

When the first communication unit 13-13-1-*a* makes a request for the channel configuration such as the RRC connection establishment to the second communication unit 13-13-1-*b*, the first communication unit 13-13-1-*a* identifies information on the second BS 200 in neighbor cell information included in system information on the first BS 100 and provide the identified information to the second communication unit 31-13-1-*b*. In some embodiments, the information on the second BS 200 is provided only when the value of the access fail counter is greater than or equal to the preset value.

The second communication unit 13-13-1-*b* transmits RRC connection request message 2 to the second BS 200, and transmits an RRC connection configuration completion message to the second BS 200 when receiving an RRC connection configuration message as response message 2 of RRC connection request message 2. When response message 2 corresponds to an RRC connection reject message, the second communication unit 13-13-1-*b* selectively performs the next procedure according to wait time information or redirection information included in the corresponding RRC connection reject message.

Here, when wait time information is included in the RRC connection reject message, the access history identification unit increases a value of an access fail counter, and the second communication unit 13-1-*b* transmits RRC connection request message 2 again or makes a request for a channel configuration such as the RRC connection establishment to the second channel configuration unit 13-2 according to a wireless communication system change condition such as a case where the value of the access fail counter is greater than or equal to a preset value. The wireless communication system change configuration additionally includes a condition in which the band change condition used by the first communication unit 13-1-*a* is satisfied and the RRC connection is rejected in all frequency bands.

When the channel configuration such as the RRC connection establishment by the first channel configuration unit 13-1 is rejected by a network node such as the BS, the second channel configuration unit 13-2 performs the channel configuration such as the RRC connection establishment by accessing the second wireless communication system. When response message 2 corresponds to the RRC connection reject message and is satisfied with the wireless communication system change condition, the second channel configuration unit 13-2 performs the channel configuration such as the RRC connection establishment by accessing the third BS 300.

Figure 6:
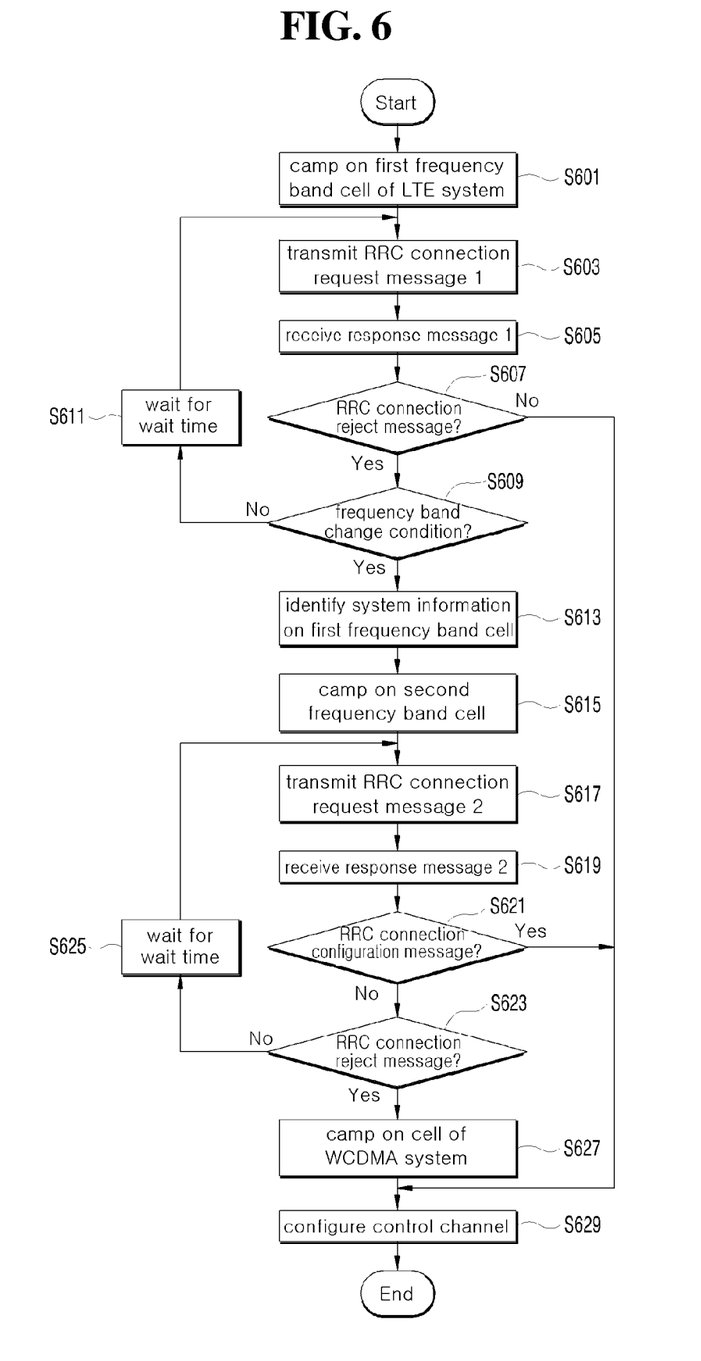
FIG. 6 is a flowchart of an operation method of a UE apparatus according to some embodiments of the present disclosure.

FIG. 6 is a flowchart of an operation method of the UE apparatus according to some embodiments of the present disclosure.

In some embodiments, procedures of the operation method according to this disclosure, to be discussed hereinafter are implemented and stored in a computer-executable recording medium which is executed by a processor and/or an ASIC of the UE apparatus.

As illustrated in FIG. 6, the operation method of the UE apparatus according to some embodiments of the present disclosure includes steps S601 and S603 of transmitting RRC connection request message 1 to a cell of a first frequency band through a first wireless communication system (for example, LTE wireless communication system) in an RRC idle state, step S605 of receiving response message 1 of RRC connection request message 1 from the cell of the first frequency band, and steps S607 and S609 of, when response message 1 corresponds to an RRC connection reject message, counting the number of RRC connection reject messages received from the cell of the first frequency band and determining whether the counted number of received RRC connection reject messages is satisfied with a band change condition.

In some embodiments, the method includes step S611 of re-transmitting RRC connection request message 1 after waiting for a wait time when the number of RRC connection reject messages received from the cell of the first frequency band is not satisfied with a predetermined condition of an access fail counter, and step S613 of identifying neighbor cell information included in system information on the cell of the first frequency band when the number of RRC connection reject messages received from the cell of the first frequency band is satisfied with the band change condition. In some embodiments, the method further includes steps S615 and S617 of transmitting RRC connection request message 2 to a cell of a second frequency band operated in the first wireless communication system based on the identified neighbor cell information and step S619 of receiving response message 2 of RRC connection request message 2 from the cell of the second frequency band.

The method further includes steps S621 and S623 of counting the number of RRC connection reject messages received from the cell of the second frequency band and determining whether the counted number of received RRC connection reject messages is satisfied with a wireless communication system change condition when response message 2 of RRC connection request message 2, which is received from the cell of the second frequency band, is the RRC connection reject message, step S625 of re-transmitting RRC connection request message 2 after waiting for a wait time when the number of received RRC connection reject messages is not satisfied with the wireless communication system change condition, step S627 of switching to a mode for accessing a cell of a second wireless communication system (for example, WCDMA wireless communication system) when the number of received RRC connection reject messages is satisfied with the wireless communication system change condition, and step S629 of configuring a control channel by transmitting an RRC connection configuration completion message to the cell of the second frequency band or configuring a control channel in the cell of the second wireless communication system when response message corresponds to an RRC connection configuration message.

Hereinafter, a process in which a channel configuration device of the UE apparatus according to some embodiments of the present disclosure configures a channel through an RRC connection establishment will be described in more detail with reference to FIGS. 4 to 6. In the following description, the first BS 100 uses band 5 (850 MHz band) among E-UTRA frequency bands in the LTE system, the second BS 200 uses band 3 (1800 MHz band) among the E-UTRA frequency band in the LTE system, and the third BS 300 uses band 1 (2.1 GHz band) among the E-UTRA frequency band in the WCDMA wireless communication system.

First, the first communication unit 13-13-1-*a* of the first channel configuration unit 13-13-1 included in the access control unit 13 registers a position thereof in the first BS 100 of the cell using band 5 of the LTE wireless communication system to be camped on in step S601, and transmits RRC connection request message 1 to the first BS 100 in an RRC idle state in step S603.

Further, when the first BS 100 transmits response message 1 of RRC connection request message 1, the first communication unit 13-13-1-*a* receives response message 1 in step S605.

Here, the first communication unit 13-13-1-*a* identifies whether response message 1 corresponds to an RRC connection configuration message or an RRC connection reject message in step S607. When response message 1 corresponds to the RRC connection configuration message, the first communication unit 13-13-1-*a* informs the first BS 100 of the completion of the RRC connection establishment by transmitting an RRC configuration completion message to the first BS 100, so as to configure a control channel through a general processing procedure in step S629.

When it is identified that response message 1 corresponds to the RRC connection reject message in step S607, the first communication unit 13-13-1-*a* identifies wait time information or redirection information included in the corresponding RRC connection reject message.

Further, when the wait time information is included in the RRC connection reject message, the access history identification unit increases a value of an access fail counter and determines whether the value of the access fail counter is satisfied with a band change condition. For example, when the number of received RRC connection reject messages corresponds to a preset number, the access history identification unit determines that the value of the access fail counter is satisfied with the band change condition in step S609.

Here, when the number of RRC connection reject messages received from the first BS 100 (or the value of the access fail counter) is not satisfied with the band change condition, the first communication unit 13-13-1-*a* transmits RRC connection request message 1 to the first BS 100 again after waiting for the corresponding wait time in step S611.

However, when it is determined that the number of RRC connection reject messages received from the first BS 100 (or the value of the access fail counter) is satisfied with the band change condition in step S609, the first communication unit 13-13-1-*a* makes a request for a channel configuration such as an RRC connection establishment to the second communication unit 13-13-1-*b*. At this time, the first communication unit 13-13-1-*a* identifies information on the second BS 200 in neighbor cell information within System Information Block 5 (SIB5) included in system information on the first BS 100 (system information broadcasted by an eNodeB) and provide the identified information to the second communication unit 13-13-1-*b* in step S613. At this time, the information on the second BS 200 is provided only when the value of the access fail counter is greater than or equal to the preset value.

Next, the second communication unit 13-13-1-*b* registers a position in the second BS 200 of the cell using band 3 of the LTE wireless communication system based on the neighbor cell information provided from the first communication unit 13-13-1-*a* to be camped on in step S615, and transmits RRC connection request message 2 to the second BS 200 in an RRC idle state in step S617.

Further, when the second BS 200 transmits response message 2 of RRC connection request message 2, the second communication unit 13-13-1-*b* receives response message in step S619.

Here, the second communication unit 13-13-1-*b* identifies whether response message 2 corresponds to an RRC connection configuration message or an RRC connection reject message in step S621. When response message 2 corresponds to the RRC connection configuration message, the second communication unit 13-13-1-*b* informs the second BS 200 of the completion of the RRC connection establishment by transmitting an RRC configuration completion message to the second BS 200, so as to configure a control channel through a general processing procedure in step S629.

When it is identified that response message 2 corresponds to the RRC connection reject message in step S621, the second communication unit 13-13-1-*b* identifies wait time information or redirection information included in the corresponding RRC connection reject message.

Further, when the wait time information is included in the RRC connection reject message, the access history identification unit increases a value of an access fail counter and determines whether the value of the access fail counter is satisfied with a change condition. For example, when the number of received RRC connection reject messages corresponds to a preset number, the access history identification unit determines that the value of the access fail counter is satisfied with the band change condition in step S623.

For example, the reference number of times by which it is determined whether the wireless communication system change condition is satisfied is configured by adding the number of RRC connection reject messages received from the first BS 100 and the number of RRC connection reject messages received from the second BS 200 as shown in Equation 1 below.

$$\text{Reference number of times} = \text{Number of LTE wireless communication system frequency bands} \times 2 \quad \text{[Equation 1]}$$

When a maximum value of a counter, which counts the number of received RRC connection reject messages is configured to a value generated by subtracting 1 from the reference number of times of Equation 1, whether the wireless communication system change condition is satisfied is easily determined in step S623.

When the number of RRC connection reject message received from the second BS 200 is not satisfied with the wireless communication system change condition, the second communication unit 13-13-1-*b* transmits RRC connection request message 2 to the second BS 200 again after waiting for the corresponding wait time in step S625.

However, when it is determined that the number of RRC connection reject messages received from the second BS 200 is satisfied with the wireless communication system change condition in step S623, the second communication unit 13-13-1-*b* makes a request for a channel configuration including an RRC connection establishment to the second channel configuration unit 13-13-2.

Then, the second channel configuration unit 13-13-2 switches to a mode for accessing the third BS 300 using band 1 (2.1 GHz band) among the E-UTRA frequency bands in the WCDMA wireless communication system and configures a control channel by performing the RRC connection establishment such as transmitting a new RRC request message to the third BS 300 in step S629.

As described above so far, according to some embodiments of the present disclosure, when an RRC connection is rejected while an RRC connection establishment is performed in an environment where there are cells operating a multi-carrier within the same area, the UE apparatus performs the RRC connection establishment with a cell of another frequency band by itself. Further, the RRC connection is rejected in all frequency bands of a first wireless communication system, the UE apparatus switches to a second wireless communication system and performs the RRC connection establishment.

In some embodiments, the above-discussed method of FIG. 3 and the above-discussed operation method of FIG. 6, according to this disclosure, are implemented in the form of program being readable through a variety of computer means and be recorded in any non-transitory computer-readable medium. Here, this medium, in some embodiments, contains, alone or in combination, program instructions, data files, data structures, and the like. These program instructions recorded in the medium are, in some embodiments, specially designed and constructed for the present disclosure or known to persons in the field of computer software. For example, the medium includes hardware devices specially configured to store and execute program instructions, including magnetic media such as a hard disk, a floppy disk and a magnetic tape, optical media such as CD-ROM (Compact Disk Read Only Memory) and DVD (Digital Video Disk), magneto-optical media such as floptical disk, ROM, RAM (Random Access Memory), and flash memory. Program instructions include, in some embodiments, machine language codes made by a complier and high-level language codes executable in a computer using an interpreter or the like. These hardware devices are, in some embodiments, configured to operating as one or more of software to perform the operation of this disclosure, and vice versa.

A computer program (also known as a program, software, software application, script, or code) for implementing the message processing method according to this disclosure is, in some embodiments, written in a programming language, including compiled or interpreted languages, or declarative or procedural languages. A computer program includes, in some embodiments, a unit suitable for use in a computing environment, including as a stand-alone program, a module, a component, or a subroutine. A computer program is or is not, in some embodiments, correspond to a file in a file system. A program is, in some embodiments, stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program is, in some embodiments, deployed to be executed on one or more computer processors located locally at one site or distributed across multiple remote sites and interconnected by a communication network. Each block of the block diagram and each step of the flowchart attached to present disclosure indicate a part of a module, a segment, or a code including one or more executable instructions for performing specified logical function(s). Further, it should be noted that the functions mentioned in the blocks or steps can be out of order in alternative embodiments. For example, two successive blocks or steps is simultaneously performed substantially or is performed in a reverse order according to the corresponding functions sometimes.

Although the embodiments of the present disclosure have been described for illustrative purposes, those skilled in the art will appreciate that various modifications, additions and substitutions are possible, without departing from the scope and spirit of the disclosure. Accordingly, the embodiments disclosed in the present disclosure are merely to not limit but describe the technical spirit of the present disclosure. Further, the scope of the technical spirit of the present disclosure is limited by the embodiments. Accordingly, the protection scope of the present disclosure should be defined by the appended claims, and should be construed to cover all technical ideas that are equivalent thereto.

What is claimed is:

1. A User Equipment (UE) accessing a wireless communication system operating a Multi-Carrier (MC), the UE comprising:
    an access history identification unit configured to, when the UE accesses the wireless communication system in a first frequency band on which the UE is camped, identify whether the UE stores an access fail history of the first frequency band by referring to an access fail counter for the first frequency band;
    a search unit configured to, when the UE stores the access fail history of the first frequency band,
        receive a parameter indicating an accessibility to the wireless communication system in a second frequency band, which is different from the first frequency band, and
        search for the second frequency band based on the received parameter; and
    an access control unit configured to, when the wireless communication system is found in the second frequency band based on a result of the search, access the wireless communication system through the second frequency band,
    wherein the access history identification unit does not increase a value of the access fail counter for the first frequency band when the RRC connection reject message, which does not include wait time information is received through the first frequency band.

2. The UE of claim 1, wherein the search unit is configured to receive a SystemInformationBlockType5(SIB5) Information Element (IE) which includes the parameter.

3. The UE of claim 1, further comprising:
    a notification unit configured to notify a user of the UE that the access through the second frequency band is performed.

4. The UE of claim 3, wherein the notification unit is further configured to display an indicator indicating a frequency band being accessed, on a screen of the UE.

5. The UE of claim 1, wherein the access history identification unit is further configured to
    manage the access fail counter according to an access history of each frequency band,
    increase the value of the access fail counter for the each frequency band whenever an access attempt in the each frequency band fails, and
    initialize the value of the access fail counter in the each frequency band fail when the access attempt in the each frequency band is successful.

6. The UE of claim 5, wherein, when access through the second frequency band fails, or when the value of the access fail counter for the second frequency band indicates that there is an access fail history in the second frequency band, or when the second frequency band is not found by the search unit, the access control unit is configured to access a Wideband Code Division Multiple Access (WCDMA) wireless communication system.

7. The UE of claim 5, wherein
    the access control unit is further configured to
        attempt to access the wireless communication system through the second frequency band by transmitting a Radio Resource Control (RRC) connection request message to the wireless communication system, and
        receive an RRC connection reject message from the wireless communication system when said attempt to access the wireless communication system is failed,
    the access history identification unit is further configured to increase the value of the access fail counter for the second frequency band when the RRC connection reject message is received, and the access control unit comprises:
a first communication unit configured to transmit the RRC connection request message and receive the RRC connection reject message in the first frequency band; and
a second communication unit configured to transmit the RRC connection request message in the second frequency band.

8. The UE of claim 7, wherein, when the value of the access fail counter for the second frequency band is greater than or equal to a preset value, the search unit is further configured to receive the parameter indicating the accessibility to the wireless communication system in the second frequency band.

9. A method of accessing a wireless communication system operating a Multi-Carrier (MC) by a User Equipment (UE) apparatus, the method comprising:
when the UE accesses the wireless communication system in a first frequency band on which the UE apparatus is camped, identifying whether the UE stores an access fail history of the first frequency band by referring to an access fail counter for the first frequency band;
when the UE stores the access fail history of the first frequency band,
receiving a parameter indicating an accessibility to the wireless communication system in a second frequency band, which is different from the first frequency band;
searching for the second frequency band based on the received parameter; and
when the wireless communication system is found in the second frequency band based on a result of said searching, accessing the wireless communication system through the second frequency band,
wherein the identifying comprises:
receiving the RRC connection reject message, which does not include wait time information, through the first frequency band; and
maintaining a value of the access fail counter for the first frequency band.

10. The method of claim 9, wherein the receiving comprises receiving a SystemInformationBlockType5(SIB5) Information Element (IE) which includes the parameter.

11. The method of claim 9, further comprising:
accessing a Wideband Code Division Multiple Access (WCDMA) wireless communication system, when access through the second frequency band fails, or when the value of the access fail counter for the second frequency band indicates that there is an access fail history in the second frequency band, or when the second frequency band is not found in said searching.

12. The method of claim 9, wherein
an access fail counter for each frequency band is managed according to an access history of the each frequency band, and
the value of the access fail counter for the each frequency band is increased whenever an access attempt in the each frequency band fails, and initialized when the access attempt in the each frequency band is successful.

13. The method of claim 12, wherein
the accessing comprises:
attempting to access the wireless communication system through the second frequency band by transmitting a Radio Resource Control (RRC) connection request message; and
receiving a reception of an RRC connection reject message from the wireless communication system when said attempting to access the wireless communication system is failed, and
the value of the access fail counter for the second frequency band is increased when the RRC connection reject message is received as a response to the RRC connection request message.

14. The method of claim 13, wherein the receiving of the parameter indicating the accessibility to the wireless communication system in the second frequency band is performed when the value of the access fail counter for the second frequency band is greater than or equal to a preset value.

15. A non-transitory computer-readable storage medium storing a program for causing a processor of wireless communication system operating a Multi-Carrier (MC) by a User Equipment (UE) apparatus to execute operations comprising:
when the UE accesses the wireless communication system in a first frequency band on which the UE apparatus is camped, identifying whether the UE stores an access fail history of the first frequency band by referring to an access fail counter for the first frequency band;
when the UE stores the access fail history of the first frequency band, receiving a parameter indicating an accessibility to the wireless communication system in a second frequency band, which is different from the first frequency band;
searching for the second frequency band based on the received parameter; and
when the wireless communication system is found in the second frequency band based on a result of said searching, accessing the wireless communication system through the second frequency band,
wherein the identifying comprises:
receiving the RRC connection reject message, which does not include wait time information, through the first frequency band; and
maintaining a value of the access fail counter for the first frequency band.

\* \* \* \* \*